United States Patent Office 3,151,120
Patented Sept. 29, 1964

3,151,120
THIENO[3,2-b]INDOLE ESTERS AND AMIDES
Lincoln Harvey Werner, Summit, N.J., assignor to Ciba Corporation, a corporation of Delaware
No Drawing. Filed Aug. 15, 1961, Ser. No. 131,473
12 Claims. (Cl. 260—293.4)

The present invention concerns basic esters and basic amides of 4H-thieno[3,2-b]indole 3-carboxylic acids. More especially, it relates to compounds of the formula:

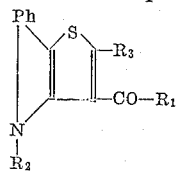

in which Ph stands for a 1,2-phenylene (or o-phenylene) radical, $R_1$ represents tertiary amino-lower alkyl-oxy or tertiary amino-lower alkyl-amino, in which tertiary amino is separated from oxy and amino, respectively, by at least two carbon atoms of the lower alkyl group, $R_2$ stands for hydrogen, an aliphatic radical or a substituted aliphatic radical, and $R_3$ represents hydrogen or an aliphatic radical, salts, quaternary ammonium compound, N-oxides or salts of N-oxides thereof, as well as process for the preparation of such compounds.

The 1,2-phenylene (o-phenylene) radical may be unsubstituted or may be substituted by one or more than one of the same or of different substituents attached to any of the four positions available for substitution. Substituents are, for example, lower alkyl, e.g. methyl, ethyl, n-propyl, isopropyl and the like, hydroxyl, etherified hydroxyl, such as lower alkoxy, e.g. methoxy, ethoxy, n-propyloxy, isopropyloxy and the like, esterified hydroxyl, such as halogeno (representing hydroxyl esterified by a hydrohalic acid), e.g. fluoro, chloro, bromo and the like, nitro, amino, such as N,N-di-lower alkyl-amino, e.g. N,N-dimethylamino, N,N-diethylamino and the like, trifluoromethyl, or any other suitable substituent. The 1,2-phenylene group Ph in the above formula stands, therefore, for 1,2-phenylene, lower alkyl-1,2-phenylene, hydroxy-1,2-phenylene, etherified hydroxy-1,2-phenylene, such as lower alkoxy-1,2-phenylene and the like, esterified hydroxy-1,2-phenylene, such as halogeno-1,2-phenylene and the like, nitro-1,2-phenylene, amino-1,2-phenylene, such as N,N-di-lower alkyl-amino-1,2-phenylene and the like, trifluoromethyl-1,2-phenylene or any other suitably substituted 1,2-phenylene group.

The group $R_1$ stands for a tertiary amino-lower alkyl-oxy or a tertiary amino-lower alkyl-amino group, which may be represented, for example by the formula —X—($C_nH_{2n}$)—Am in which X stands for an oxy group of the formula —O— or a secondary amino group of the formula —NH—, the letter $n$ represents a whole number from 2 to 7, whereby the group of the formula —($C_nH_{2n}$)— separates the group Am from the group X by at least two carbon atoms, and Am represents a tertiary amino group.

The group —($C_nH_{2n}$)— in the above formula, in which $n$ stands for a whole number from 2 to 7, therefore, represents an alkylene radical which has from two to seven carbon atoms and separates the tertiary amino group, e.g. group Am, from the oxy or secondary amino group, e.g. the group X, by at least two carbon atoms. Such alkylene radical may be represented by a straight or branched carbon chain, and stands for 1,2-ethylene, 1-methyl-1,2-ethylene, 2-methyl-1,2-ethylene, 1,3-propylene, 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

The tertiary amino group, such as the group Am in the above formula, is represented, for example, by N,N-di-substituted amino, in which each of the substituents is represented, for example, by lower alkyl, lower alkenyl, cycloalkyl, cycloalkyl-lower alkyl, monocyclic carbocyclic aryl, monocyclic carbocyclic aryl-lower alkyl and the like. Such substituents have from one to ten carbon atoms, and may stand, for example, for lower alkyl, e.g. methyl, ethyl, propyl, isopropyl, butyl, isobutyl, secondary butyl, pentyl, neopentyl and the like, lower alkenyl, e.g. allyl, 2-methylallyl and the like, cycloalkyl, e.g. cyclopentyl, cyclohexyl and the like, cycloalkyl-lower alkyl, e.g. cyclopentylmethyl, 2-cyclohexylethyl and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like. N,N-di-substituted amino groups are, for example, N,N-di-lower alkylamino, in which lower alkyl has from one to four carbon atoms, e.g. N,N-dimethylamino, N-methyl-N-ethylamino, N,N-diethylamino, N,N-di-n-propylamino, N,N-di-isopropylamino and the like, N-cycloalkyl-N-lower alkyl-amino, in which cycloalkyl has from three to seven ring carbon atoms, and lower alkyl has from one to four carbon atoms, e.g. N-cyclopentyl-N-methyl-amino, N-cyclohexyl-N-methyl-amino, N-cyclohexyl-N-ethyl-amino and the like, or N-lower alkyl-N-phenyl-lower alkyl-amino, in which lower alkyl has from one to four carbon atoms, e.g. N-benzyl-N-methyl-amino, N-benzyl-N-ethyl-amino, N-methyl-N-(1-phenylethyl)-amino, N-methyl-N-(2-phenylethyl)-amino and the like, or any other equivalent N,N-di-substituted amino group. The substituents, particularly lower alkyl, may also carry functional groups, such as hydroxyl, lower alkoxy, e.g. methoxy, ethoxy and the like, lower alkyl-mercapto, e.g. methylmercapto, ethylmercapto and the like, or any other suitable group. N,N-di-substituted-amino groups of this type are, for example, N-hydroxy-lower alkyl-N-lower alkyl-amino, e.g. N-(2-hydroxyethyl)-N-methyl-amino and the like, N,N-di-hydroxy-lower alkyl-amino, e.g. N,N-di-(2-hydroxyethyl)-amino and the like.

The tertiary amino group, e.g. the group Am in the above formula, may also be represented by 1-N,N-alkylene-imino or by 1-N,N-aza-alkylene-imino groups, in which alkylene has from four to six carbon atoms, as well as by 1-N,N-oxa-alkylene-imino or by 1-N,N-thia-alkylene-imino, in which alkylene has preferably four carbon atoms. Together with the nitrogen atom such alkylene, aza-alkylene, oxa-alkylene or thia-alkylene radicals represent, for example, 1-N,N-alkylene-imino, in which alkylene has from four to six carbon atoms, such as 1-pyrrolidino radicals, e.g. 1-pyrrolidino, 2-methyl-1-pyrrolidino and the like, 1-piperidino radicals, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino and the like, 1-N,N-(aza-alkylene)-imino, particularly 1-N,N-(N-lower alkyl-aza-alkylene)-imino, in which alkylene has from four to six carbon atoms, such as 1-N,N-(3-aza-1,5-pentylene)-imino, particularly 1-N,N-(3-aza-3-lower alkyl-1,5-pentylene)-imino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, 1-N,N-(3-oxa-1,5-pentylene)-imino, e.g. 4-morpholino and the like, 1-

N,N-(3-thia-1,5-pentylene)-imino, e.g. 4-thiamorpholino and the like, or any other equivalent tertiary amino group.

The tertiary amino-lower alkyl substituent may also be represented by a heterocyclic or a heterocyclic-lower alkyl radical, in which the tertiary amino group is part of a heterocyclic nucleus. Such heterocyclic nucleus may be connected through one of its ring carbon atoms or through a lower alkylene radical, e.g. methylene, 1,2-ethylene and the like, with the oxy atom or the secondary amino group; such groups are represented, for example, by 1-methyl-3-pyrrolidylmethyl, 1-methyl-3-piperidylmethyl, 1-methyl-4-piperidyl and the like.

The group $R_2$, attached to the nitrogen atom of the indole portion of the molecule may represent hydrogen. It may also stand for an aliphatic radical, such as lower alkyl, e.g. methyl, ethyl, n-propyl, isopropyl, n-butyl, secondary butyl and the like, as well as lower alkenyl, e.g. allyl, 2-butenyl and the like, cycloalkyl, e.g. cyclopropyl, cyclopentyl, cyclohexyl, cycloheptyl and the like. Other substituents representing the group $R_2$ are, for example, substituted aliphatic radicals, particularly substituted lower alkyl groups. Such substituted aliphatic radicals may be represented, for example, by carbocyclic aryl-aliphatic groups, such as monocyclic carbocyclic aryl-lower alkyl, particularly phenyl-lower alkyl, e.g. benzyl, 1-phenylethyl, 2-phenylethyl and the like, or phenyl-lower alkyl, in which phenyl is substituted by one or more than one of the same or of different substituents, such as lower alkyl, e.g. methyl, ethyl, n-propyl, isopropyl, n-butyl and the like, hydroxyl, etherified hydroxyl, such as lower alkoxy, e.g. methoxy, ethoxy, n-propyloxy, isopropyloxy, n-butyloxy and the like, esterified hydroxyl, such as halogeno, e.g. fluoro, chloro, bromo and the like, nitro, amino, such as N,N-di-lower alkyl-amino, e.g. N,N-dimethylamino, N,N-diethylamino and the like, trifluoromethyl or any other suitable substituent. More particularly, a substituted aliphatic radical represents primarily a tertiary amino-aliphatic radical, especially a tertiary amino-lower alkyl group, as, for example, represented by the formula $-(C_nH_{2n})-Am$, in which the letter $n$, the group of the formula $-(C_nH_{2n})-$ and Am have the previously-given meaning. Thus, lower alkyl, representing a lower alkylene group, for example, the group of the formula $-(C_nH_{2n})-$, has from two to seven carbon atoms, and separates the tertiary amino group, e.g. the group Am, from the indole-nitrogen atom by at least two carbon atoms; such a lower alkylene is represented, for example, by 1,2-ethylene, 1-methyl-1,2-ethylene, 2-methyl-1,2-ethylene, 1,3-propylene, 1,3-butylene, 1,4-butylene, 1,5-pentylene and the like. The tertiary amino group in the tertiary amino-aliphatic radical, e.g. the group Am, has the same meaning as the one previously given and represents, for example, N,N-di-lower alkyl-amino, e.g. N,N-dimethylamino, N-methyl-N-ethyl-amino, N,N-diethylamino, N,N-di-n-propylamino, N,N-di-isopropylamino and the like, N-cycloalkyl-N-lower alkyl-amino, e.g. N-cyclopentyl-N-methyl-amino, N-cyclohexyl-N-methyl-amino, N-cyoclohexyl-N-ethyl-amino and the like, N-lower alkyl-N-phenyl-lower alkyl-amino, e.g. N-benzyl-N-methyl-amino, N-benzyl-N-ethyl-amino, N-methyl-N-(1-phenylethyl)-amino, N-methyl-N-(2-phenylethyl)-amino and the like, N-hydroxy-lower alkyl-N-lower alkyl-amino, e.g. N-(2-hydroxy-ethyl)-N-methyl-amino and the like, N,N-di-hydroxy-lower alkyl-amino, e.g. N,N-di-(2-hydroxy-ethyl)-amino and the like, 1-N,N-alkylene-imino, such as 1-pyrrolidino, e.g. 1-pyrrolidino, 2-methyl-1-pyrrolidino and the like, 1-piperidino, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino and the like, 1-N,N-(aza-alkylene)-imino, particularly 1-N,N-(N-lower alkyl-aza-alkylene)-imino, such as 1-N,N-(3-aza-1,5-pentylene)-imino, particularly 1-N,N-(3-aza-3-lower alkyl-1,5-pentylene)-imino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, 1-N,N-(3-oxa-1,5-pentylene)-imino, e.g. 4-morpholino and the like, 1-N,N-(3-thia-1,5-pentylene)-imino, e.g. 4-thiamorpholino and the like, or any other equivalent tertiary amino group. A tertiary amino-lower alkyl substituent may also be represented by a heterocyclic or a heterocyclic-lower alkyl radical, in which the tertiary amino group is part of a heterocyclic nucleus. Such heterocyclic nucleus may be connected through one of its ring carbon atoms or through a lower alkylene radical, e.g. methylene, 1,2-ethylene and the like, with the indole-nitrogen atom; such groups are represented, for example, by 1-methyl-3-pyrrolidylmethyl, 1-methyl-3-piperidylmethyl, 1-methyl-4-piperidyl and the like.

The group $R_3$ represents hydrogen or an aliphatic radical, particularly lower alkyl, e.g. methyl, ethyl, n-propyl, isopropyl, n-butyl and the like, or any other suitable aliphatic radical.

Salts of the compounds of this invention are primarily pharmacologically and therapeutically acceptable, non-toxic acid addition salts with inorganic or organic acids, for example, mineral acids, e.g. hydrochloric, hydrobromic, sulfuric, phosphoric acids and the like, organic carboxylic acids, e.g. formic, acetic, propionic, pivalic, glycolic, lactic, malonic, succinic, maleic, malic, tartaric, citric, benzoic, cinnamic, mandelic, salacylic, 4-aminosalicylic, 2-phenoxy-benzoic, 2-acetoxybenzoic, nicotinic, isonicotinic acid and the like, or any other suitable carboxylic acid, as well as organic sulfonic acids, e.g. methane sulfonic, ethane sulfonic, ethane 1,2-disulfonic, 2-hydroxyethane sulfonic, p-toluene sulfonic acid and the like, or any other suitable acid. Salts, which may be prepared primarily for identification purposes, are, for example, those with acidic organic nitro compounds, e.g. picric, picrolonic, flavianic acid and the like, or metal complex acid, e.g. phosphotungstic, phosphomolybdic, chloroplatinic, Reinecke acid and the like. Mono- or poly-salts may be formed depending on the number of salt-forming groups and/or the conditions used for the salt formation.

Quaternary ammonium compounds of the compounds of this invention may be either mono- or poly-quaternary ammonium compounds depending on the number of tertiary amino groups present and/or the conditions of the quaternization reaction. Quaternary ammonium compounds are particularly those with lower aliphatic hydrocarbon halides, sulfates, or sulfonates, such as lower alkyl halides, e.g. methyl, ethyl, n-propyl or isopropyl chloride, bromide, iodide and the like, di-lower alkyl sulfates, e.g. dimethyl sulfate, diethyl sulfate and the like, lower alkyl lower alkane sulfonates, e.g. ethyl or methyl methane sulfonate, ethane sulfonate, or lower alkyl lower hydroxy-alkane sulfonates, e.g. methyl 2-hydroxy-ethane sulfonate and the like, or lower alkyl monocyclic carbocyclic aryl sulfonates, e.g. methyl or ethyl p-toluene sulfonate and the like, as well as those with carbocyclic aryl-aliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the salts of such hydroxides with acids, particularly with the organic carboxylic acids mentioned hereinabove.

Also included within the scope of the present invention are the N-oxides of the aforementioned compounds, as well as the acid addition salts of such N-oxides, for example, those with the above-mentioned acids.

The compounds of the present invention have antihistaminic properties and can be used as antihistaminic agents to relieve allergic disorders, such as, for example, hay fever, urticaria, allergies caused by food, plant pollens, medicinal agents and the like. They also show local anesthetic properties and can be used accordingly, for example, in the treatment of burns and similar conditions.

Particularly useful are the compounds of the formula:

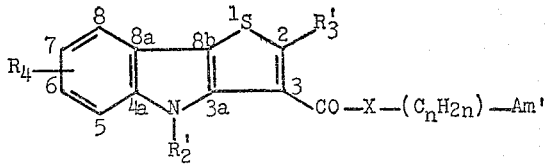

in which X and $n$ have the previously-given meaning, i.e. X represents the oxy group of the formula —O— or the secondary amino group of the formula —NH—, and $n$ stands for a whole number from two to seven, whereby the group of the formula —$(C_nH_{2n})$— separates the group Am' from the group X by at least two carbon atoms, Am' represents N,N-di-lower alkyl-amino, e.g. N,N-dimethyl-amino, N-ethyl-N-methyl-amino, N,N-diethylamino, N,N-di-n-propylamino and the like, N,N-alkylene-imino, in which alkylene has from four to seven carbon atoms, e.g. 1-pyrrolidino, 1-piperidino, 1-N,N-(1,6-hexylene)-imino and the like, 4-lower alkyl-1-piperazino, e.g. 4-methyl-1-piperazino, 4-ethyl-1-piperazino and the like, 4-morpholino or 4-thiamorpholino, $R_2'$ stands for hydrogen or the group of the formula —$(C_nH_{2n})$—Am', in which $n$ and Am' have the previously-given meaning, and the group —$(C_nH_{2n})$— separates the group Am' from the indole nitrogen by at least two carbon atoms, the group $R_3'$ represents hydrogen or lower alkyl, particularly methyl, and the group $R_4$ represents hydrogen, lower alkyl, e.g. methyl, ethyl, n-propyl, isopropyl, n-butyl and the like, lower alkoxy, e.g. methoxy, ethoxy, n-propyloxy, isopropyloxy, n-butyloxy and the like, halogeno, e.g. fluoro, chloro, bromo and the like, trifluoromethyl and the like, or the pharmacologically acceptable, nontoxic acid addition salts thereof.

The new compounds of this invention may be used in the form of pharmaceutical preparations, which contain the new compounds in admixture with a pharmaceutical organic or inorganic, solid or liquid vehicle suitable for enteral or parenteral administration. For making up the preparations there may be used substances, which do not react with the new compounds, such as water, gelatine, lactose, starches, lactic acid, stearic acid, magnesium stearate, stearyl alcohol, talc, vegetable oils, benzyl alcohols, gums, propylene glycol, polyalkylene glycols, or any other known carrier used for pharmaceutical preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other pharmacologically useful substances.

The compounds of this invention may be prepared according to known methods; for example, they may be obtained by converting in a reactive functional derivative of a 4H-thieno[3,2-b]indole 3-carboxylic acid, particularly in a compound of the formula:

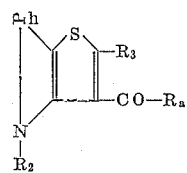

in which Ph, $R_2$ and $R_3$ have the previously-given meaning and the substituent —CO—$R_a$ stands for a reactive, functionally converted carboxyl group, the reactive functionally converted carboxyl group —CO—$R_a$ into the desired basic ester or basic amido group, and, if desired, converting a resulting salt into the free compound or into another salt, and/or, if desired, replacing in a resulting compound, in which the nitrogen of the indole portion carries a hydrogen, such hydrogen by an aliphatic or a substituted aliphatic group, and/or, if desired, converting a resulting compound into a salt, a quaternary ammonium compound, an N-oxide or a salt of an N-oxide thereof.

A reactive functionally converted carboxyl group of the starting material is, for example, a reactive esterified carboxyl group, for example, a carbo-lower alkoxy group, e.g. carbomethoxy, carbethoxy and the like, or any other reactive esterified carboxyl group, such as, for example, a carboxyl group esterified by tetrahydropyranyl, p-nitrophenyl, benzyl and the like, or, more particularly, a halogeno-carbonyl group, particularly chlorocarbonyl, or bromocarbonyl and the like.

The conversion of the reactive, functionally converted carboxyl group into the desired basic ester or basic amido group is carried out according to known methods. For example, a halogeno-carbonyl group may be converted into the basic ester group by treatment of the starting material having such halogeno-carbonyl group with a tertiary amino-lower alkanol, preferably in the presence of a suitable, inert solvent, e.g. ethyl acetate, benzene and the like, and, if necessary, at an elevated temperature, in a closed vessel and/or in the atmosphere of an inert gas, e.g. nitrogen and the like. Or, an esterified carboxyl group may be converted into the desired basic esterified carboxyl group, by reacting the starting material having a reactive esterified carboxyl group with a tertiary amino-lower alkanol in the presence of a suitable transesterification reagent, such as, for example, an alkali metal, e.g. sodium, potassium and the like, compound of the tertiary amino-lower alkanol, or any other suitable transesterification reagent, e.g. benzyl trimethyl ammonium hydroxide, potassium cyanide and the like. If necessary, an additional inert solvent may be present and the reaction may be carried out at an elevated temperature, in a closed vessel, and/or, in the atmosphere of an inert gas, e.g. nitrogen and the like.

A desired basic amido group may be introduced, for example, by treating the starting material having a halogenocarbonyl group with a tertiary amino-lower alkylamine, preferably in a suitable inert solvent, e.g. benzene and the like, if necessary, while cooling or heating, in a closed vessel, and/or in the atmosphere of an inert gas, e.g. nitrogen and the like. Or, a reactive esterified carboxyl group may be converted into the desired basic amido group, for example, by treatment of the starting material having such reactive esterified carboxyl group with the tertiary amino-lower alkanol in a suitable solvent, e.g. ethanol and the like, and at an elevated temperature, and, if necessary, in a closed vessel, and/or in the atmosphere of an inert gas, e.g. nitrogen and the like.

The starting materials used in the above procedure are known or may be prepared according to known methods, as, for example, described by Benary et al., Ber., Vol. 48, p. 593 (1915).

The compounds of this invention may also be prepared, for example, by reacting a hydrazine compound of the formula:

in which Ph and $R_2$ have the previously-given meaning, with a ketone compound of the formula:

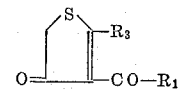

in which $R_1$ and $R_3$ have the previously-given meaning, or the enol derivative thereof, and, if necessary, eliminating ammonia from the resulting hydrazone compound of the formula:

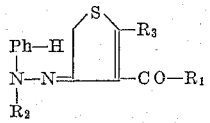

in which Ph, $R_1$, $R_2$ and $R_3$ have the previously-given meaning, by treatment with a Lewis acid, and, if desired, carrying out the optional steps.

The above reaction is preferably carried out according to the Fischer indole synthesis, i.e. hydrazone formation and ring closure are carried out simultaneously. This one-step procedure may be performed, for example, by treating a mixture of the hydrazine compound and the thienone compound with a suitable Lewis acid reagent, such as zinc chloride, cuprous chloride, boron trifluoride etherate, dilute sulfuric acid, ethanolic hydrogen chloride, glacial acetic acid, a mixture of acetic and hydrochloric acid and the like, preferably at an elevated temperature, and, if necessary, in the presence of an inert diluent, e.g. methanol and the like, and/or in a closed vessel, and/or in the atmosphere of an inert gas, e.g. nitrogen and the like.

The starting materials are known or may be prepared according to the procedure used for the preparation of known analogs.

In a resulting compound, in which the nitrogen atom of the indole-portion carries a hydrogen, such hydrogen may be replaced by an aliphatic or a substituted aliphatic radical. This substitution of hydrogen by the desired radical is carried out according to known methods. For example, a resulting N-unsubstituted compound is converted into the metal, particuilarly an alkali metal, e.g. lithium, sodium, potassium and the like, compound thereof, and the latter is then treated with the reactive ester of an aliphatic or a substituted aliphatic alcohol. The metal, particularly alkali metal, compound may be prepared by treating a resulting N-unsubstituted 4H-thieno-[3,2-b]indole 3-carboxylic acid ester or amide with an alkali metal, e.g. sodium, potassium and the like, or an alkali metal hydride or amide, e.g. sodium or potassium hydride or amide, in the presence of a suitable inert solvent, or by any other known method. The reactive ester of an aliphatic or substituted aliphatic alcohol, which is reacted with the metal compound of the N-unsubstituted 4H-thieno[3,2-b]indole compound, is particularly an aliphatic halide or substituted aliphatic halide, e.g. chloride, bromide and the like (which represents the reactive ester of an aliphatic alcohol or a substituted aliphatic alcohol with a hydrohalic acid, e.g. hydrochloric, hydrobromic acid and the like), or an aliphatic sulfonate or substituted aliphatic sulfonate, e.g. methane sulfonate, p-toluene sulfonate and the like (which represents the reactive esters of an aliphatic or a substituted aliphatic alcohol with an organic sulfonic acid, e.g. methane sulfonic, p-toluene sulfonic acid and the like). The reaction is carried out in the presence of an inert solvent, preferably the solvent used during the preparation of the metal compound, if necessary, while cooling or heating, in a closed vessel, and/or in the atmosphere of an inert gas, e.g. nitrogen and the like. This procedure may also be employed for the manufacture of starting materials of the previous-described procedure, in which the indole nitrogen atom carries an aliphatic or substituted aliphatic group, and in which a reactive, functionally converted carboxyl group of the thieno[3,2-b]indole 3-carboxylic acid is converted into the desired basic ester or the basic amido group.

The compounds of this invention may be obtained in the form of the free bases or as the salts thereof. A salt may be converted into the free base, for example, by treatment with an alkaline reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, or any other suitable alkaline reagent, as well as an anion exchange resin and the like. A free base may be converted into its acid addition salts by reacting the former with one of the organic acids mentioned hereinbefore. The salt-forming reaction may be carried out, for example, by treating a solution of the free base in an inert solvent, or in a solvent mixture with the acid or a solution thereof and isolating the desired salt. A resulting salt may be converted into another salt, for example, by treating it with a metal, such as alkali metal, e.g. sodium, potassium and the like, salt of an acid, in the presence of a suitable solvent. Salts may be obtained as hemihydrates, monohydrates, sesquihydrates or polyhydrates depending on the conditions used in the formation of the salts.

N-oxides of the compounds of the present invention may be prepared according to known methods, for example, by treating a solution of the resulting compound containing a tertiary nitrogen atom or a salt thereof in a suitable inert solvent with an N-oxidizing reagent, such as, for example, ozone, hydrogen peroxide, an inorganic peracid, e.g. persulfuric acid and the like, an organic persulfonic acid, e.g. p-toluene persulfonic acid and the like, or primarily an organic percarboxylic acid, e.g. peracetic acid, perbenzoic acid, monoperphthalic acid and the like. The N-oxides may be obtained in the form of the free bases or the acid addition salts thereof; N-oxide free bases may be converted into their acid addition salts or the salts may be converted into the free N-oxide bases according to the previously-described procedures. Mono- or poly-N-oxides may be obtained depending on the number of tertiary amino groups present.

The quaternary ammonium compounds of the compounds of this invention may be obtained, for example, by reacting the tertiary base with an ester formed by a hydroxylated compound and a strong inorganic or organic acid, such as a mineral acid, e.g. hydrochloric, hydrobromic, hydriodic, sulfuric acid and the like, or a strong organic acid, such as a lower alkane sulfonic acid, e.g. methane sulfonic, ethane sulfonic acid and the like, hydroxy-lower alkane sulfonic acid, e.g. 2-hydroxy-ethane sulfonic acid and the like, a monocyclic carbocyclic aryl sulfonic acid, e.g. p-toluene sulfonic acid and the like. Reactive esters are, for example, lower alkyl halides, e.g. methyl, ethyl, n-propyl or isopropyl chloride, bromide, iodide and the like, phenyl-lower alkyl halides, e.g. benzyl, 1-phenylethyl or 2-phenylethyl chloride, bromide or iodide and the like, lower alkyl lower alkane sulfonates, e.g. methyl methane sulfonate, methyl ethane sulfonate, ethyl methane sulfonate, ethyl ethane sulfonate and the like, lower alkane hydroxy-lower alkane sulfonate, e.g. methyl 2-hydroxy-ethane sulfonate, ethyl 2-hydroxy-ethane sulfonate and the like, or lower alkyl monocyclic carbocyclic aryl sulfonate, e.g. methyl p-toluene sulfonate and the like. The quaternizing reactions may be performed in the absence or presence of an inert solvent, if necessary, while cooling or heating, in a closed vessel, and/or in the atmosphere of an inert gas, e.g. nitrogen and the like.

Resulting quaternary ammonium compounds may be converted into the corresponding quaternary ammonium hydroxides, for example, by reacting a quaternary ammonium halide with silver oxide or a quaternary ammonium sulfate with barium hydroxide, by treating a quaternary ammonium salt with an anion exchanger, or by electrodialysis. From a resulting quaternary ammonium hydroxide there may be obtained quaternary ammonium hydroxide, there may be obtained quaternary ammonium salts by reacting the base with acids, for example, those used for the preparation of acid addition salts. A quaternary ammonium compound may also be converted directly into another quaternary ammonium salt without the formation of an intermediate quaternary ammonium hydroxide; for example, a quaternary ammonium iodide may be reacted with freshly prepared silver chloride to yield the quaternary ammonium chloride, or a quaternary ammonium iodide may be converted into the corresponding chloride by treatment with hydrochloric acid in anhydrous methanol. Quaternary ammonium compounds may also be isolated as hydrates; depending on the number of tertiary amino groups present in the molecule and/or the conditions for their formation, mono- or poly-quaternary ammonium compounds may be formed.

The invention also comprises any modification of the process wherein a compound obtainable as an intermediate at any stage of the process is used as staritng material and the remaining step(s) of the process is(are) carried out. It also includes any new intermediates, which may be formed in one of the procedures outlined hereinbefore.

In the process of this invention such starting materials are preferably used which lead to the final products mentioned in the beginning as preferred embodiments of the invention.

The following examples are intended to illustrate the invention and are not to be construed as being limitations thereon. Temperatures are given in degrees Centigrade.

*Example 1*

A total of 5.0 g. of 2-methyl-4H-thieno[3,2-b]indole 3-carboxylic acid chloride is dissolved in warm 100 ml. of benzene; a solution of 2.3 g. of 2-N,N-diethylaminoethylamine in 20 ml. of benzene is added while stirring. A precipitate is formed and is separated from the supernatant solution. The latter is diluted with diethyl ether, whereupon 5.4 g. of 2-methyl-4H-thieno[3,2-b]indole 3-carboxylic acid 2-N,N-diethylaminoethyl-amide hydrochloride of the formula:

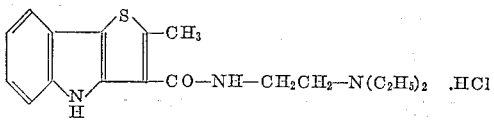

crystallizes, which melts at 160–163° after recrystallization from isopropanol. A sample is converted into the 3 - N - (2 - N,N - diethylaminoethyl) - carboxamido - 2-methyl-4H-thieno[3,2-b]indole, by treatment with aqueous potassium carbonate; the free base melts at 139–141° after recrystallization from ethyl acetate.

Other compounds which may be prepared according to the above procedure are, for example, 2-methyl-4H-thieno[3,2-b]indole 3-carboxylic acid 3-N, N-di-n-butylaminopropyl-amide hydrochloride, M.P. 192–195° (after recrystallization from isopropanol);
2-methyl-4H-thieno[3,2-b]indole 3-carboxylic acid 3-N, N-dimethylaminopropyl-amide hydrochloride, M.P. 246–249° (after repeated recrystallizations from ethanol);
2-methyl-4H-thieno[3,2-b]indole 3-carboxylic acid 2-N, N-dimethylaminoethyl-amide hydrochloride, M.P. 201–203° (after repeated crystallizations from ethanol);
2-methyl-4H-thieno[3,2-b]indole 3-carboxylic acid 4-N, N - diethylamino - 1 - methyl - butyl - amide hydrochloride, M.P. 181–183° (after repeated recrystallizations from isopropanol),
as well as 7-chloro-2-methyl-4H-thieno[3,2-b]indole 3-carboxylic acid 2-N,N-diethylaminoethyl-amide, 7-bromo - 2 - methyl - 4H - thieno[3,2-b]indole 3-carboxylic acid 3-N,N-di-n-butylaminopropyl-amide, 7-methoxy - 2 - methyl - 4H - thieno[3,2-b]indole 3 - carboxylic acid 3-N,N-dimethylaminopropyl-amide, 7-methyl-4H-thieno[3,2-b]indole 3-carboxylic acid 3-N, N-dimethylaminopropylamide, 2-methyl-4H-thieno[3, 2-b]indole 3-carboxylic acid 2-(1-piperidino)-ethyl-amide, 2-methyl-4H-thieno[3,2-b]indole 3-carboxylic acid 2-(4-methyl-1-piperazino)-ethylamide and the like.

The starting material used in the above procedure may be prepared as follows: A solution of 60.0 g. of 2-methyl-4H-thieno[3,2-b]indole 3-carboxylic acid and 60 ml. of thionyl chloride in 600 ml. of toluene is refluxed for one hour; the crystalline desired 2-methyl-4H-thieno[3,2-b]-indole 3-carboxylic acid chloride precipitates upon cooling and is filtered off, M.P. 152–154°; yield 48.7 g.

*Example 2*

A solution of 7.3 g. of 7-chloro-2-methyl-thieno[3,2-b]-indole 3-carboxylic acid chloride in 200 ml. of ethyl acetate is treated with 4.3 g. of 5-N,N-diethylaminopentanol according to the procedure described in Example 1; 9.5 g. of the 7-chloro-2-methyl-4H-thieno[3,2-b]indole 3-carboxylic acid 5-N,N-diethylaminopentyl ester of the formula:

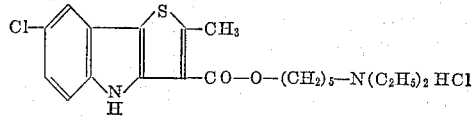

is isolated and recrystallized from ethanol, M.P. 194–196°.

Other compounds which may be prepared according to the above procedure are, for example, 2-methyl-4H-thieno[3,2-b]indole 3-carboxylic acid 2-N, N-diethylaminoethyl ester hydrochloride, M.P. 223–225 (after repeated recrystallizations from ethanol);
2-methyl-4H-thieno[3,2-b]indole 3-carboxylic acid 2-N, N-dimethylaminoethyl ester hydrochloride, M.P. 211–213 (after repeated recrystallizations from ethanol);
2-methyl-4H-thieno[3,2-b]indole 3-carboxylic acid 5-N, N-diethylaminopentyl ester hydrochloride, M.P. 165–167° (after repeated recrystallizations from isopropanol);
as well as 2-methyl-4H-thieno[3,2-b]indole 3-carboxylic acid 2-(1-piperidino)-ethyl ester, 7-bromo-2-methyl-4H-thieno[3,2-b]indole 3-carboxylic acid 2-(4-morpholino)-ethyl ester, 4H-thieno[3,2-b]indole 3-carboxylic acid 3-N,N-di-n-propylaminopropyl ester, 7-methoxy-2-methyl-4H-thieno[3,2-b]indole 3-carboxylic acid 2-(4-methyl-1-piperazino)-ethyl ester and the like.

The starting material used in the above procedure may be prepared according to the method described in Example 1 using 7-chloro-2-methyl-4H-thieno[3,2-b]indole 3-carboxylic acid as the starting material and refluxing for three hours; the 7 - chloro - 2 - methyl-4H-thieno[3,2-b]indole 3-carboxylic acid chloride melts at 198–200°.

*Example 3*

To a solution of 6.6 g. of 2-methyl-4H-thieno[3,2-b]-indole 3-carboxylic acid 2-N,N-diethylaminoethyl-amide in 50 ml. of toluene is added 1.42 g. of a 55 percent sodium amide suspension in toluene. After refluxing for four hours, the reaction mixture is then treated with 3.3 g. of 2-(1-piperidino)-ethyl chloride in 20 ml. of toluene, and refluxing is continued for an additional four hours while stirring. After cooling, the insoluble material is filtered off, the filtrate is evaporated to dryness, and the residue is dissolved in toluene. The solution is treated with a saturated solution of hydrogen chloride in dry ethyl acetate and yields the 2-methyl-4-[2-(1-piperidino)-ethyl]-thieno[3,2-b]indole 3 - carboxylic acid 2 - N,N-di-ethylaminoethyl-amide dihydrochloride of the formula:

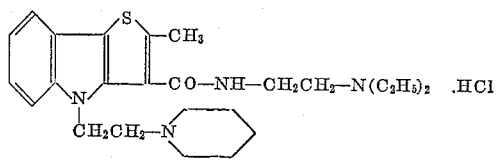

which melts at 237–241° after recrystallization from isopropanol.

Other compounds, which may be prepared according to the above procedure using the appropriate starting materials and reagents are for example, 4 - (2 - N,N - dimethylamino - 2 - methyl - ethyl) - 2-methyl - thieno[3,2-b]indole 3-carboxylic acid 3-N,N-di-methylaminopropyl-amide dihydrochloride, M.P. 105°, as well as 7-chloro - 4 - (2 - N,N-dimethylaminoethyl)-2-methyl - thieno[3,2-b]indole 3-carboxylic acid 2-(4-morpholino) - ethyl - amide, 4 - benzyl - 7-methoxy-2-methyl-thieno[3,2 - b]indole 3 - carboxylic acid 3 - N,N - diethylaminopropyl - amide, 2,4,7-trimethyl-thieno[3,2-b]indole 3 - carboxylic acid 2-(1-pyrrolidino)-ethyl - amide, 4-(2-N,N - diethylamino - 2 - methyl - ethyl) - 2 - methyl-thieno[3,2-b]indole 3 - carboxylic acid 2-N,N - dimethylaminoethyl ester, 7 - bromo 2 - methyl-4-(2-N,N-diethylaminoethyl)-thieno[3,2-b]indole 3-carboxylic acid 2-(1-pyrrolidino)-ethyl ester and the like.

What is claimed is:

1. A member selected from the group consisting of a compound of the formula:

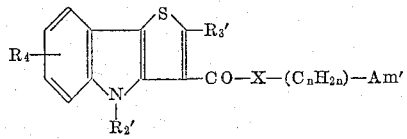

in which X represents a member selected from the group consisting of oxy of the formula —O— and secondary amino of the formula —NH—, $n$ stands for a whole number from two to seven, the group of the formula $$-(C_nH_{2n})-$$

separates Am' from the group X by at least two carbon atoms, Am' represents a member selected from the group consisting of N,N-di-lower alkyl - amino, N,N - alkyleneimino, in which alkylene has from four to seven carbon atoms, 4-lower alkyl-1-piperazino, 4-morpholino and 4-thiamorpholino, $R_2'$ stands for a member selected from the group consisting of hydrogen and the group of the formula —$(C_nH_{2n})$— Am', in which $n$ and Am' have the previously-given meaning and the group of the formula —$(C_nH_{2n})$— separates Am' from the indole nitrogen atom by at least two carbon atoms, $R_3'$ represents a member selected from the group consisting of hydrogen and lower alkyl, and $R_4$ represents a member selected from the group consisting of hydrogen, lower alkyl, lower alkoxy, halogeno and trifluoromethyl, an acid addition salt thereof, a lower alkyl quaternary ammonium compound thereof, an N-oxide thereof and an acid addition salt of an N-oxide thereof.

2. 2-methyl - 4H - thieno[3,2 - b]indole 3 - carboxylic acid 2-N,N-diethylaminoethyl-amide.

3. 2 - methyl - 4H - thieno[3,2 - b]indole 3 - carboxylic acid 3-N,N-n-butylaminopropyl-amide.

4. 2 - methyl - 4H - thieno[3,2 - b]indole 3 - carboxylic acid 3-N,N-dimethylaminopropyl-amide.

5. 2 - methyl - 4H - thieno[3,2 - b]indole 3 - carboxylic acid 2-N,N-diethylaminoethyl-amide.

6. 2 - methyl - 4H - thieno[3,2 - b]indole 3 - carboxylic acid 4-N,N-diethylamino-1-methyl-butyl-amide.

7. 2 - chloro - 2 - methyl - 4H - thieno[3,2 - b]indole 3-carboxylic acid 5-N,N-diethylaminopentyl ester.

8. 2 - methyl - 4H - thieno[3,2 - b]indole 3 - carboxylic acid 2-N,N-diethylaminoethyl ester.

9. 2 - methyl - 4H - thieno[3,2 - b]indole 3 - carboxlic acid 2-N,N-dimethylaminoethyl ester.

10. 2 - methyl - 4H - thieno[3,2 - b]indole 3 - carboxylic acid 5-N,N-diethylaminopentyl ester.

11. 2 - methyl - 4 - [2-(1-piperidino) - ethyl] - thieno[3,2-b]indole 3-carboxylic acid 2-N,N-diethylaminoethyl.

12. 4 - (2 - N,N - dimethylamino - 2 - methyl - ethyl)-2-methyl-4H-thieno[3,2-b]indole 3-carboxylic acid 3-N,N-dimethylaminopropyl-amide.

References Cited in the file of this patent

Geschickter: Journal of the American Medical Association, February 1, 1930, pages 326–328–R11. A5.